United States Patent
Linlor

(10) Patent No.: US 10,463,015 B2
(45) Date of Patent: Nov. 5, 2019

(54) SYSTEM AND METHOD FOR DETECTING PREPARATION CUP ATTACHMENT

(71) Applicant: Technologies Holdings Corp., Houston, TX (US)

(72) Inventor: Peter M. Linlor, Pearland, TX (US)

(73) Assignee: Technologies Holdings Corp., Houston, TX (US)

(*) Notice: Subject to any disclaimer, the term of this patent is extended or adjusted under 35 U.S.C. 154(b) by 496 days.

(21) Appl. No.: 15/204,832

(22) Filed: Jul. 7, 2016

(65) Prior Publication Data

US 2018/0007860 A1     Jan. 11, 2018

(51) Int. Cl.
*A01J 5/04*     (2006.01)
*A01J 5/007*    (2006.01)
*A01J 5/16*     (2006.01)

(52) U.S. Cl.
CPC .......... *A01J 5/048* (2013.01); *A01J 5/007* (2013.01); *A01J 5/16* (2013.01)

(58) Field of Classification Search
USPC ........................................ 119/14.01–14.55
See application file for complete search history.

(56) References Cited

U.S. PATENT DOCUMENTS

| | | | | |
|---|---|---|---|---|
| 4,223,635 A | * | 9/1980 | Akerman | A01J 5/0175 119/14.02 |
| 5,960,736 A | * | 10/1999 | Ludington | A01J 5/007 119/14.08 |
| 2005/0274326 A1 | * | 12/2005 | Stellnert | A01J 5/007 119/14.08 |
| 2009/0177418 A1 | * | 7/2009 | Innings | A01J 5/007 702/51 |
| 2011/0011343 A1 | * | 1/2011 | Sandberg | A01J 5/007 119/14.02 |
| 2012/0017836 A1 | * | 1/2012 | Torgerson | A01J 5/007 119/14.08 |
| 2012/0097107 A1 | * | 4/2012 | Torgerson | A01J 5/007 119/14.02 |
| 2016/0151551 A1 | * | 6/2016 | Felber | A61M 1/06 604/67 |

FOREIGN PATENT DOCUMENTS

CN    105706938 A    *    6/2016    ............. A01J 5/007

* cited by examiner

*Primary Examiner* — Andrea M Valenti
(74) *Attorney, Agent, or Firm* — Baker Botts L.L.P.

(57) ABSTRACT

A system comprising a teat preparation cup coupled to a vacuum pump. A first pressure sensor measures the vacuum level of the vacuum pump. A second pressure sensor measures vacuum level inside the preparation cup. The system further comprises a controller comprising an interface, a memory, and a processor.

The processor determines if the vacuum pump has sufficient vacuum level and communicates instructions to induce a partial vacuum in the teat preparation cup. The processor determines if the teat preparation cup has a vacuum level greater than a vacuum threshold value and when this condition is achieved, communicates instructions to initiate a teat preparation cycle comprising allowing fluid flowing from a fluid source container through the teat preparation cup into a fluid disposal container.

7 Claims, 3 Drawing Sheets

SYSTEM AND METHOD FOR DETECTING PREPARATION CUP ATTACHMENT

TECHNICAL FIELD OF THE INVENTION

This invention relates generally to dairy equipment and more specifically to a system and method for detecting preparation cup attachment.

BACKGROUND OF THE INVENTION

Dairy farming is becoming an increasingly automated industry. In the industry, preparing teats before milking them is often desirable and required by government regulations. Present teat preparation systems are lacking in several respects. The present invention addresses some of the deficiencies in teat preparation systems.

SUMMARY OF THE INVENTION

A system comprising a teat preparation cup coupled to a fluid source container and a fluid disposal container is disclosed. The teat preparation cup is further coupled to a vacuum pump, wherein the vacuum pump is operable to change air pressure inside the teat preparation cup. A first pressure sensor measures the pressure of the vacuum pump. A second pressure sensor measures pressure inside the preparation cup. The system further comprises a controller comprising an interface, a memory, and a processor. The interface is operable to communicate with the vacuum pump, the first pressure sensor, and second pressure sensor. The memory is operable to store a first vacuum threshold value and a second vacuum threshold value. The processor is operable to receive information indicating an attempt to attach the teat preparation cup onto a teat. The processor is further operable to receive information from the first pressure sensor to determine if the vacuum pump has a vacuum level that is greater than the first vacuum threshold value. If the vacuum pump vacuum level is greater than the first threshold value, the processor is operable to communicate instructions to increase vacuum in the teat preparation cup using the vacuum pump. The processor is further operable to receive information from the second pressure sensor to determine if the teat preparation cup has a vacuum level that is greater than the second vacuum threshold value. If the teat preparation cup vacuum level is greater than the second vacuum threshold value, the processor is operable to communicate instructions to initiate a teat preparation cycle comprising allowing fluid flow from the fluid source container through the teat preparation cup into the fluid disposal container.

The present embodiment presents several technical advantages. For example, in the present embodiment, the teat preparation cycle is not initiated until the controller determines that the vacuum pump is ready to increase vacuum in the teat preparation cup. This avoids attempting to induce a vacuum in the preparation cup using insufficient vacuum level from the vacuum pump. Further, in the present embodiment, the controller ensures that the vacuum level inside the teat preparation cup is above a predetermined vacuum threshold indicating that the teat preparation cup is securely attached to a teat before initiating a teat preparation cycle.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
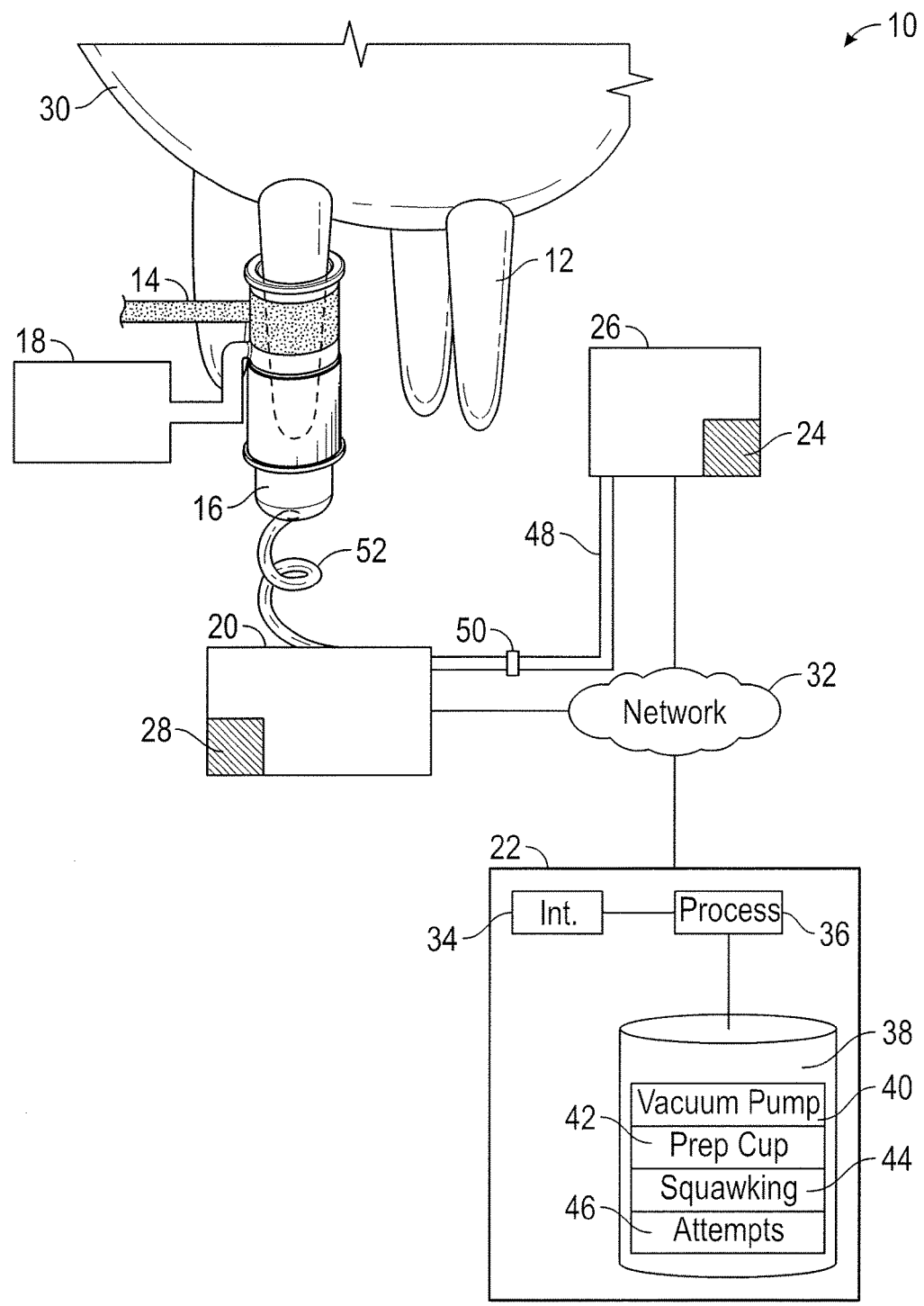
FIG. 1 illustrates a general overview of a dairy milking system.
Figure 2:
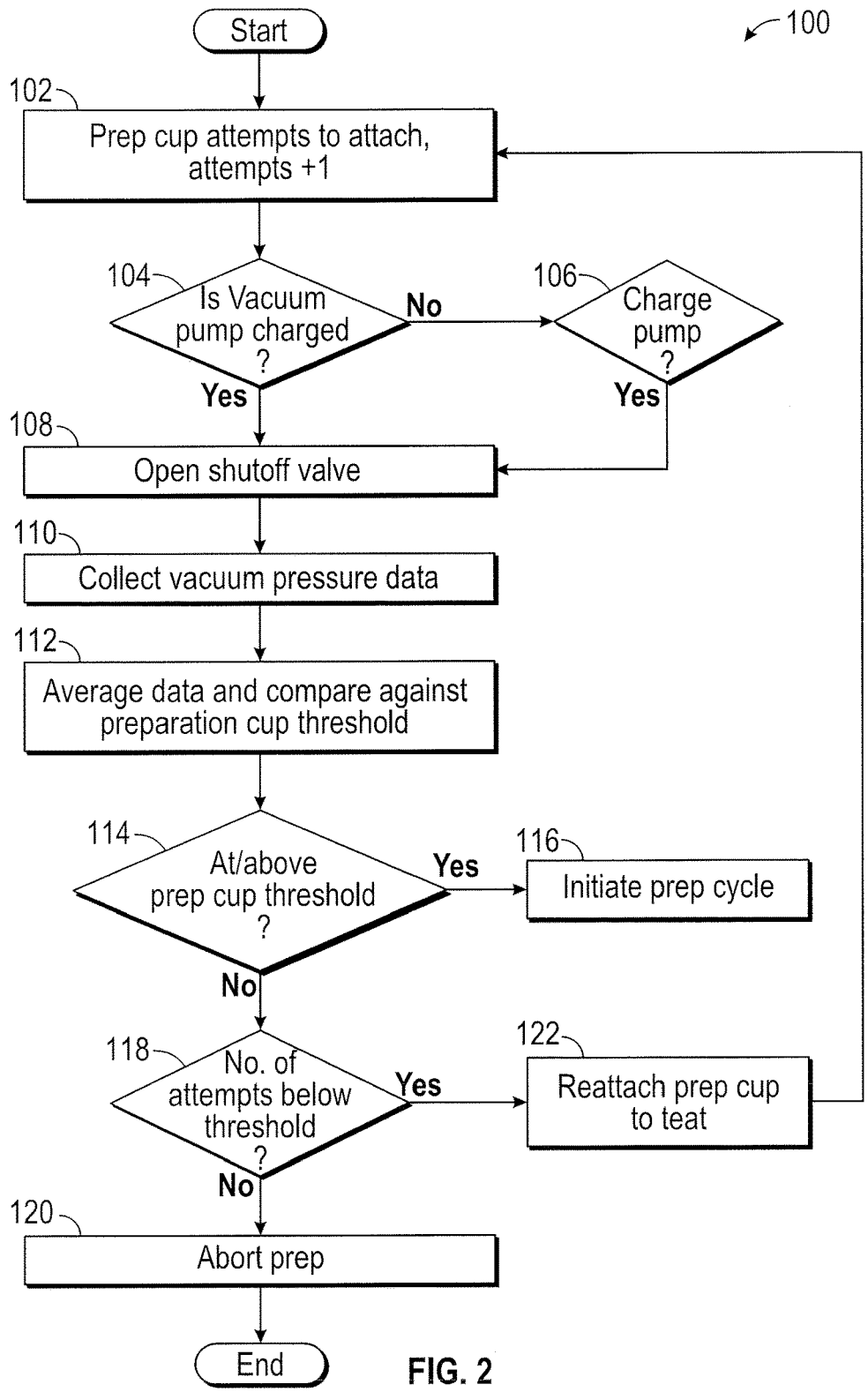
FIG. 2 illustrates a process for detecting preparation cup attachment.
Figure 3:
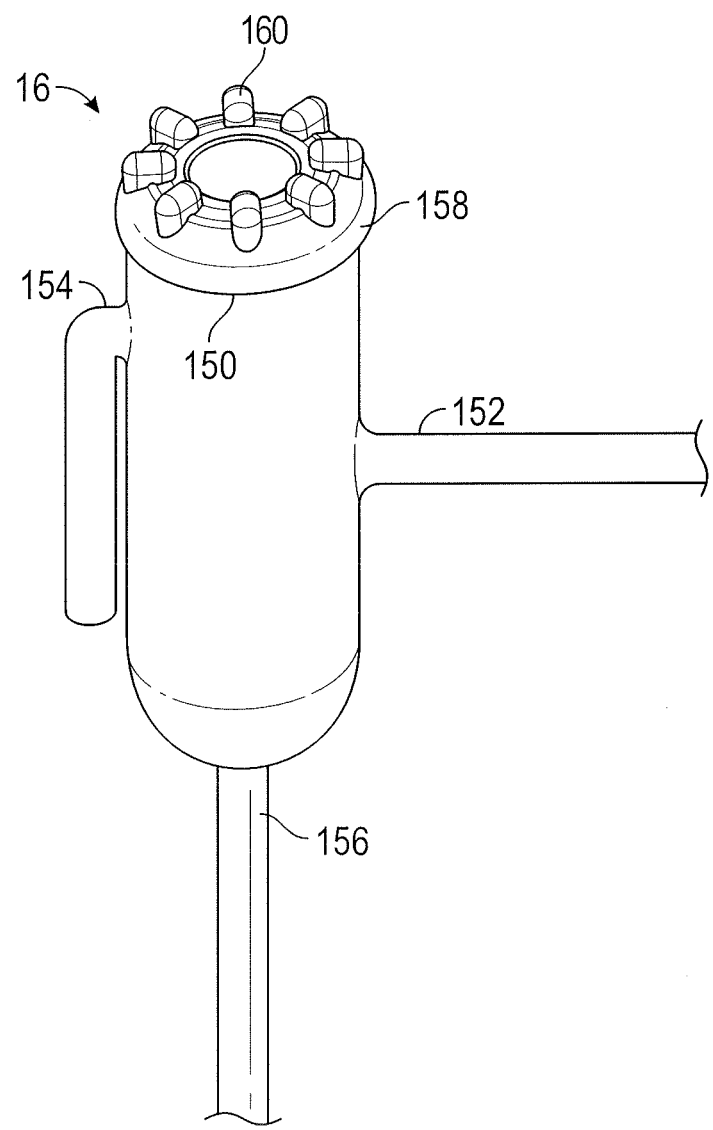
FIG. 3 illustrates one embodiment of a preparation cup.

Embodiments of the present disclosure and its advantages are best understood by referring to FIGS. 1 through 3 of the drawings, like numerals being used for like and corresponding parts of the various drawings.

In the dairy industry, collecting milk from dairy livestock such as cows is an important part of dairy farming. The process of collecting milk typically involves preparing dairy livestock teats by treating the teats with preparatory fluid such as detergent and other chemicals prior to milking the teats to extract milk. This is generally done by first placing a teat inside a teat preparation cup and then running a teat preparation cycle for washing the teat with the preparatory fluid. During the teat preparation cycle, preparatory fluid flows through the preparation cup into a fluid disposal chamber. After this preparation process, the teat is milked using a separate milking cup.

It is advantageous to use robotics to perform these repetitive teat preparation and milking steps. As one example, a robotic arm can be used to automatically attach the teat preparation cup to a teat and then initiate the teat preparation cycle. Attaching a teat preparation cup to a teat may involve inducing a vacuum inside the teat preparation cup after a teat is placed inside the cup so that the cup forms a suction that holds onto the teat. However, determining whether the preparation cup has securely attached onto a teat presents myriad challenges. For instance, after the location of a teat has been determined, a cow may move before the robot can position the preparation cup onto a teat. Similarly, the preparation cup may only partially attach onto a teat and may either fall off during the teat preparation cycle or expose only a part of the teat to the preparatory fluid. Further, the teat preparation cup may attach onto the dairy livestock's udder instead of onto a teat thereby causing the electronics to falsely register a secure teat attachment of the preparation cup.

The embodiments of the present disclosure address several of these challenges. In one embodiment, a teat attachment detection system is disclosed that measures the pressure of a vacuum pump and the pressure inside a teat preparation cup to determine if the preparation cup has securely attached onto a teat. In the system, a controller receives an indication that a robotic arm or other similar apparatus has positioned the teat preparation cup onto a teat. Then, the controller determines if the vacuum pump is primed to induce sufficient vacuum to securely attach the preparation cup onto the teat. If so, the vacuum pump induces a vacuum in the teat preparation cup. If the teat preparation cup is aligned with the teat, the induced vacuum from the vacuum pump causes the preparation cup to become securely attached onto the teat. The controller then receives a value of the vacuum level inside the preparation cup. The controller uses this value to determine whether or not the preparation cup is securely attached to the teat. If the preparation cup is not securely attached to the teat, the controller transmits instructions to reattach the preparation cup to the teat.

The present disclosure will be described in more detail using FIGS. 1 through 3. FIG. 1 illustrates a general overview of a dairy milking system for preparing and milking a dairy livestock. FIG. 2 illustrates a process for detecting secure attachment of a preparation cup to a teat. FIG. 3 illustrates one embodiment of a preparation cup for use in the preparing of dairy livestock teats. Although the figures and following description relate to the attachment of a preparation cup to a teat, the disclosed system may be used in conjunction with a milking cup or any other related cup or container.

FIG. 1 illustrates a system 10 for preparing a teat 12 for milking. In system 10, robotic arm 14 positions preparation cup 16 onto a teat 12. Once preparation cup 16 is securely attached onto teat 12, preparatory fluid flows from a fluid container 18 into preparation cup 16. The preparatory fluid disinfects and otherwise prepares teat 12 inside preparation cup 16 and then flows out of preparation cup 16 and into a collection vessel 20. Controller 22 receives pressure readings from a first sensor 24 to determine if vacuum pump 26 is charged and operable to induce sufficient vacuum to securely attach preparation cup 16 onto teat 12. Controller 22 also receives pressure readings from a second sensor 28 to confirm that preparation cup 16 is securely attached onto teat 12.

Teat 12 may be one or more teats of any suitable dairy livestock. For example, teat 12 may belong to a cow, buffalo, goat, or any other suitable livestock. In various embodiments, the dairy livestock may have a plurality of teats 12. Generally, dairy livestock such as cows have four teats 12. Teats 12 typically extend from an udder 30.

In system 10, robotic arm 14 may be any robotic device operable to extend beneath a dairy livestock and position preparation cup 16 onto a teat 12. In one embodiment, robotic arm 14 may be operable to communicate with controller 22 and receive information and instructions for moving in various directions. As an example, controller 22 may instruct robotic arm 14 to position preparation cup 16 onto a teat 12. Robotic arm 14 may also send controller 22 information indicating that robotic arm 14 executed instructions provided by controller 22, that robotic arm 14 encountered an error, that robotic arm 14 is not powered on or any other similar suitable instructions.

Preparation cup 16 may be any suitable container or conduit through which fluid may flow and can be positioned onto a teat 12. In one embodiment, preparation cup 16 is made of a flexible material which may compress or expand in response to changes in internal and external air pressure. Preparation cup 16 may have multiple openings. A first opening of preparation cup 16 may be large enough for teat 14 to be inserted into preparation cup 16. A second opening of preparation cup 16 may serve as an ingress for preparatory fluid such as detergents and treatment chemicals to flow into preparation cup 16. A third opening of preparation cup 16 may serve an egress through which the treatment fluid exits the preparation cup 16. A fourth opening of preparation cup 16 may server a conduit between vacuum pump 26 and preparation cup 16 through which vacuum pump 26 may regulate the air pressure in and around preparation cup 16. One embodiment of such a preparation cup is described below in relation to FIG. 3.

Vacuum pump 26 may be any suitable electromechanical or mechanical device including a positive displacement pump, a momentum transfer pump, a regenerative pump, an entrapment pump or any other suitable pump that is operable to remove air and other gasses from an environment to generate a partial vacuum. In some embodiments, vacuum pump 26 may be operable to generate a vacuum level, relative to ambient atmospheric pressure, of more than twelve inches Hg. In certain embodiments, there is a vacuum bleed-off if vacuum pump 26 remains unused for a period of time. In such embodiments, vacuum pump 26 requires time to recharge after a delay in use. In one embodiment, vacuum pump 26 may require 15-20 seconds to charge before it may regenerate a vacuum level of twelve inches Hg. or more.

Vacuum pump 26 may be coupled to a first sensor 24. First sensor 24 is any type of pressure sensor including an absolute pressure sensor, gauge pressure sensor, differential pressure sensor, sealed pressure sensor or any other suitable device operable to measure the vacuum level buildup of vacuum pump 26. First sensor 24 generates an electrical signal in response to the pressure exerted upon it. In one embodiment, first sensor 24 may be positioned inside or near vacuum pump 26 to measure the vacuum level buildup of vacuum pump 26.

Fluid container 18 and collection vessel 20 may be any containers that are operable to hold preparatory fluid. Fluid container 18 may hold preparatory fluid before the fluid is used to prepare a teat 12 for milking. Fluid container 18 may be made of any suitable material and may hold any suitable preparatory fluids including water, detergent, and treatment fluids. Similarly, collection vessel 20 may be made of any suitable material operable to contain preparatory fluid after the fluid has been used to treat and/or prepare teat 12, In the illustrated embodiment, collection vessel 20 is connected to vacuum pump 26 via airway 48 having one or more shutoff valves 50. Collection vessel 20 is further connected to preparation cup 16 by airway 52. In other embodiments, vacuum pump 26 may be directly connected to preparation cup 16 via one or more airways.

Second sensor 28 may be any type of pressure sensor including a device that is similar to or different than first sensor 24. Second sensor 28 may be operable to measure the vacuum level inside preparation cup 16. Second sensor 28 may be positioned at any suitable location within system 10. In one embodiment, the vacuum level inside collection vessel 20 may be similar to the vacuum level inside preparation cup 16. In such an embodiment, second sensor 28 may be positioned inside collection vessel 20 to measure the vacuum level inside preparation cup 16. In other embodiments, second sensor 28 may be positioned at any other suitable location in system 10.

Both first sensor 24 and second sensor 28 may communicably coupled to controller 22. In one embodiment, first sensor 24 and second sensor 28 may communicate with controller 22 via network 32.

Network 32 may include any interconnecting system capable of transmitting audio, video, signals, data, messages, or any combination of the preceding. Network 32 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 10.

Controller 22 may comprise an interface 34, a processor 36, and a memory 38. The components of controller 22 may interact with each other to receive information from sensors 24 and 28 and robotic arm 14, process that information, and determine whether a preparation cup 16 is securely attached to a teat 12.

Interface 34 represents any port or connection, real or virtual, including any suitable hardware and/or software, including protocol conversion and data processing capabilities, to communicate through a LAN, WAN, or other communication system that allows controller 22 to exchange information with sensors 24 and 28, robotic arm 14, or any other components of system 10. Interface 34 receives information from and transmits information to the various components of system 10. Interface 34 may communicate with processor 36 and memory 38.

Processor 36 may be any electronic circuitry, including, but not limited to microprocessors, application specific integrated circuits (ASIC), application specific instruction set processor (ASIP), and/or state machines, that communicatively couples interface 34 and memory 38 and controls the operation of controller 22. In some embodiments, processor 36 may be single core or multi-core having a single chip containing two or more processing devices. Processor 36 may be 8-bit, 16-bit, 32-bit, 64-bit or of any other suitable architecture. Processor 36 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 36 may include other hardware and software that operates to control and process information. Processor 36 may execute computer-executable program instructions stored in memory 38. Processor 36 is not limited to a single processing device and may encompass multiple processing devices.

Memory 38 may include any one or a combination of volatile or non-volatile local or remote devices suitable for storing information. For example, memory 38 may include RAM, ROM, flash memory, magnetic storage devices, optical storage devices, network storage devices, cloud storage devices, solid state devices, or any other suitable information storage device or a combination of these devices. Memory 38 stores, either permanently or temporarily, data, operational software, other information for processor 36, other components of controller 22, or other components of system 10. For example, memory 38 may store user preferences or default settings for operating controller 22. Memory 38 may store information in one or more databases, file systems, tree structures, relational databases, any other suitable storage system, or any combination thereof. Furthermore, different information stored in memory 38 may use any of these storage systems. The information stored in memory 38 may be encrypted or unencrypted, compressed or uncompressed, and static or editable. Memory 38 may store information in one or more caches.

Memory 38 may store a vacuum pump vacuum threshold 40 and a preparation cup vacuum threshold 42. Vacuum pump vacuum threshold 40 may be a minimum acceptable vacuum level inside vacuum pump 26 before vacuum pump 26 may be used to generate a partial vacuum within preparation cup 16. In one embodiment, vacuum pump vacuum threshold 40 may be twelve inches Hg. In such an embodiment, vacuum pump 26 may not be operable to generate an acceptable vacuum level in and around preparation cup 16 until vacuum pump 26 is operable to internally generate a vacuum level of at least twelve inches Hg of vacuum with respect to ambient atmospheric pressure.

Preparation cup vacuum threshold 42 may be a minimum vacuum level value for indicating a secure attachment of preparation cup 16 to teat 12. In one embodiment, a preparation cup vacuum threshold value of twelve inches Hg. or above may indicate a secure attachment. Memory 38 may also store a squawking threshold value 44 indicating if an incomplete attachment has occurred between preparation cup 16 and teat 12. In one embodiment, the squawking threshold value 44 may be eight point three (8.3) inches Hg. and values between the squawking threshold value 44 and preparation cup vacuum threshold value 42 may indicate an incomplete attachment. Further, a vacuum level value of below the squawking threshold value 44 may indicate that preparation cup 16 failed to attach to teat 12. Additionally, memory 38 may also store a number of attempts threshold 46. Number of attempts threshold 46 is the number of times system 10 may attempt to securely attach preparation cup 16 onto teat 12 before system 10 aborts the attachment process. In one embodiment, the number of attempts threshold 46 may be three attempts and if the number of actual attempts reaches three attempts, system 10 may abort the attachment process.

In operation, controller 22 receives information via network 32 that robotic arm 14 has positioned preparation cup 16 onto a teat 12. First sensor 24 then measures the induced vacuum buildup within vacuum pump 26 and transmits that information to controller 22. If the induced vacuum buildup within vacuum pump 26 is greater than the vacuum pump vacuum threshold 40, controller 22 transmits instructions to open shutoff valve 50 in airway 48 between vacuum pump 26 and collection vessel 20. Because collection vessel 20 is connected to preparation cup 16 by one or more airways, opening shutoff valve 50 causes vacuum pump 26 to induce a partial vacuum inside preparation cup 16. Second sensor 28 then measures the vacuum level inside preparation cup 16 and transmits that information to controller 22. If the vacuum level inside preparation cup 16 is above preparation cup vacuum threshold 42 indicating that preparation cup 16 is securely attached onto teat 12, controller 22 initiates the preparation cycle causing preparatory fluid to flow from preparatory fluid container 18, through preparation cup 16, into collection vessel 20.

FIG. 2 illustrates a process 100 for detecting secure attachment of preparation cup 16 to a teat 12. In process 100, at step 102, controller 22 receives information that robotic arm 14 has attempted to position preparation cup 16 onto a teat 12 and controller 22 increments the number of attempts to attach preparation cup 16 onto teat 12 by one. At step 104, controller 22 receives a pressure value of the vacuum level inside vacuum pump 26 from first sensor 24. Controller 22 compares the received vacuum level value against vacuum pump vacuum threshold 40 to determine if the measured vacuum level from first sensor 24 is equal to or greater than vacuum pump vacuum threshold 40. If the measured vacuum level value is lower than vacuum pump vacuum threshold 40, then at step 106, controller 22 waits for a predetermined period of time, for example five seconds, for vacuum pump 26 to charge.

Once the received vacuum level value equals or exceeds vacuum pump vacuum threshold 40, at step 108, controller 22 transmits instructions to open shutoff valve 50 between vacuum pump 26 and collection vessel 20 to allow vacuum pump 26 to induce a partial vacuum inside preparation cup 16 via collection vessel 20. Next, at step 110, second sensor 28 measures the vacuum level inside collection vessel 20. Because the vacuum level inside collection vessel 20 is similar to the vacuum level inside preparation cup 16, second sensor 28 determines the vacuum level inside preparation cup 16 by measuring the vacuum level inside collection vessel 20. In one embodiment, second sensor 28 collects a series of vacuum level data points. For example, second sensor 28 may collect ten to fifty pressure values of the vacuum level inside preparation cup 16. Next, as step 112, controller 22 may determine statistics such as mean, median, mode, max, min, and standard deviation of the measured vacuum level values. Controller 22 then compares one or more of the determined and/or measured vacuum level values against the preparation cup vacuum threshold 42. Next, at step 114, controller 22 determines if the determined and/or measured vacuum value is at or above the preparation cup vacuum threshold 42. If the measured and/or determined vacuum value is at or above the preparation cup vacuum threshold 42, then, at step 116, controller 22 transmits instructions to initiate the prep cycle causing preparatory fluid to flow from preparatory fluid container 18 through preparation cup 16 into collection vessel 20.

If the measured and/or determined vacuum value is below preparation cup vacuum threshold 42, controller 22 compares the actual number of attempts to attach preparation cup 16 onto teat 12 against the number of attempts threshold 46 at step 118. In one embodiment, if the measured and/or determined vacuum value is below preparation cup vacuum threshold 42 but above squawking threshold 44, controller 22 may also inform the user that there has been an incomplete attachment. If the actual number of attempts has reached or exceeded the number of attempts threshold 46, then at step 120, controller 22 instructs robotic arm 14 to end process 100. Controller 22 may end process 100 in any suitable manner including by communicating instructions to move robotic arm 14 to a retracted position where robotic arm 14 moves down and away from the dairy livestock. If the actual number of attempts is below number of attempts threshold 46, controller 22 instructs robotic arm 14 to reattach preparation cup 16 onto teat 12 at step 122 and reinitiates process 100 at step 102. In this manner, system 10 initiates the prep cycle if preparation cup 16 is securely attached to a teat 12. Otherwise, system 10 attempts to reattach preparation cup 16 to teat 12.

FIG. 3 illustrates one embodiment of preparation cup 16. In this embodiment, preparation cup 16 has a first inlet 150, a second inlet 152, a third inlet 154, and an egress 156. Preparation cup 16 also has a liner 158 with openings 160 formed therein. During a prep cycle, before any preparatory fluids are dispensed, a teat 12 is positioned inside first inlet 150 and vacuum pump 26 creates a partial vacuum inside preparation cup 16 via egress 156. If sensor 28 registers a vacuum level greater than or equal to preparation cup vacuum threshold 42, preparatory fluid flows into the liner 158 of preparation cup 16 through third inlet 154 and flows out of egress 156.

In such an embodiment, if preparation cup 16 attaches onto an udder or other surface instead of a teat 12 during process 100, air and other fluids flow into preparation cup 16 through openings 160 in liner 158. This airflow into preparation cup 16 prevents adequate vacuum from being induced inside liner 158 and preparation cup 16. Because, in case of such a faulty attachment, there is inadequate vacuum induced inside liner 158 and preparation cup 16, second sensor 28 measures a low vacuum value and controller 22 issues an instruction to retry attachment at step 122.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants do not invoke 35 U.S.C. § 112(f) as it exists on the date of filing hereof unless the words "means for" or "step for" are explicitly used in the particular claim.

What is claimed is:

1. A system comprising:
    a teat preparation cup coupled to a fluid source container and a fluid disposal container;
    a vacuum pump coupled to the teat preparation cup, wherein the vacuum pump alters a vacuum level inside the teat preparation cup;
    a first pressure sensor that measures a vacuum level within the vacuum pump;
    a shutoff valve in an airway between the vacuum pump and the teat preparation cup;
    a second pressure sensor that measures the vacuum level inside the teat preparation cup; and
    a controller comprising:
        an interface that communicates with the vacuum pump, the first pressure sensor, and the second pressure sensor;
        a memory that stores a first vacuum threshold value and a second vacuum threshold value; and
        a processor operatively connected to said first pressure sensor and to said second pressure sensor; said processor receives information
            indicating an attempt to attach the teat preparation cup onto a teat;
            said processor receives information from the first pressure sensor and determines if the vacuum pump has a vacuum level that is greater than the first vacuum threshold value;
            wherein when the vacuum level inside the vacuum pump is greater than the first vacuum threshold value, said processor communicates instructions to open the shutoff valve to thereby induce a partial vacuum in the teat preparation cup using the vacuum pump;
            subsequently, said processor receives information from the second pressure sensor to determine if the teat preparation cup has a vacuum level that is greater than the second vacuum threshold value; and
            wherein when the teat preparation cup vacuum level is greater than the second vacuum threshold value, said processor communicates instructions to initiate a teat preparation cycle comprising allowing fluid flow from the fluid source container through the teat preparation cup into the fluid disposal container.

2. The system of claim 1, wherein the first vacuum threshold value indicates a minimum acceptable vacuum pump vacuum level and if the measured vacuum pump vacuum level is lower than the first vacuum threshold value, the processor receives one or more additional vacuum level values from the first pressure sensor until one or more of the received vacuum pump vacuum level values equal or exceed the first threshold value.

3. The system of claim 1, wherein determining if the measured teat preparation cup vacuum level is greater than the second vacuum threshold value further comprises: receiving a plurality of vacuum level values from the second sensor; calculating one or more of the mean, median, mode, standard deviation, minimum, and maximum value of the received plurality of preparation cup vacuum level values; and comparing the one or more calculated values against the second vacuum threshold value.

4. The system of claim 1, wherein the second vacuum threshold value is a vacuum level value indicating secure attachment of the teat preparation cup to the teat and if the measured teat preparation cup vacuum level is lower than the second vacuum threshold value, the processor communicates instructions to a robotic arm to reattach the teat preparation cup to the teat.

5. The system of claim 4, wherein the memory stores a third threshold value of a maximum allowable number of attachment attempts and a number of actual attachment attempts made by the robotic arm.

6. The system of claim 5, wherein the processor moves the robotic arm into a retracted position if the number of attachment attempts exceeds the third threshold value.

7. The system of claim 1, wherein the teat preparation cup has a liner with one or more ridges formed therein for airflow into the teat preparation cup when the teat preparation cup is positioned on a surface.

\* \* \* \* \*